United States Patent [19]

Westfall et al.

[11] 3,729,256
[45] Apr. 24, 1973

[54] ASSEMBLY FOR POLYMERIC DISPENSING

[75] Inventors: Wayne L. Westfall, Silver Spring; David L. Kramm, Laurel; Moises G. Sanchez, Severna Park, all of Md.

[73] Assignee: W. R. Grace & Co., New York, N.Y.

[22] Filed: Jan. 18, 1971

[21] Appl. No.: 107,043

[52] U.S. Cl. ............355/18, 355/18, 222/309, 95/14
[51] Int. Cl. ............................................G03b 27/00
[58] Field of Search ............355/40, 18; 95/14; 222/160, 309; 118/242

[56] References Cited

UNITED STATES PATENTS

| 436,627 | 9/1890 | Enjalbert | 95/14 X |
| 3,565,298 | 2/1971 | Ohlin et al. | 222/309 |
| 1,477,344 | 12/1923 | Gvadagni | 222/160 |
| 3,250,441 | 5/1966 | Levowitz et al. | 222/309 |
| 443,576 | 12/1890 | Hawks | 118/242 |

Primary Examiner—Samuel S. Matthews
Assistant Examiner—Russell E. Adams, Jr.
Attorney—Eugene M. Bond and Kenneth E. Prince

[57] ABSTRACT

The invention disclosed is for an assembly useful for storing and dispensing a liquid photocurable composition. The assembly for storing and dispensing includes a storage chamber for a liquid photocurable composition which is in flow communication with a dispense chamber having a reciprocably slidable piston therein for effecting volume displacement and dispensing of the liquid composition. The piston selectively effects transfer of liquid composition from the storage chamber into the dispense chamber and, upon reverse actuation, it selectively effects dispensing onto a support surface. The photocurable composition may be thus dispensed onto the support surface, after which it is spread into a layer for exposure to actinic light in selective photocuring.

3 Claims, 8 Drawing Figures

Patented April 24, 1973 3,729,256

INVENTORS
WAYNE L. WESTFALL
DAVID E. KRAMM
MOISES G. SANCHEZ
BY Eugene M. Boud
ATTORNEY Patented April 24, 1973

INVENTORS
WAYNE L. WESTFALL
DAVID E. KRAMM
MOISES G. SANCHEZ

BY Eugene M. Boud
ATTORNEY

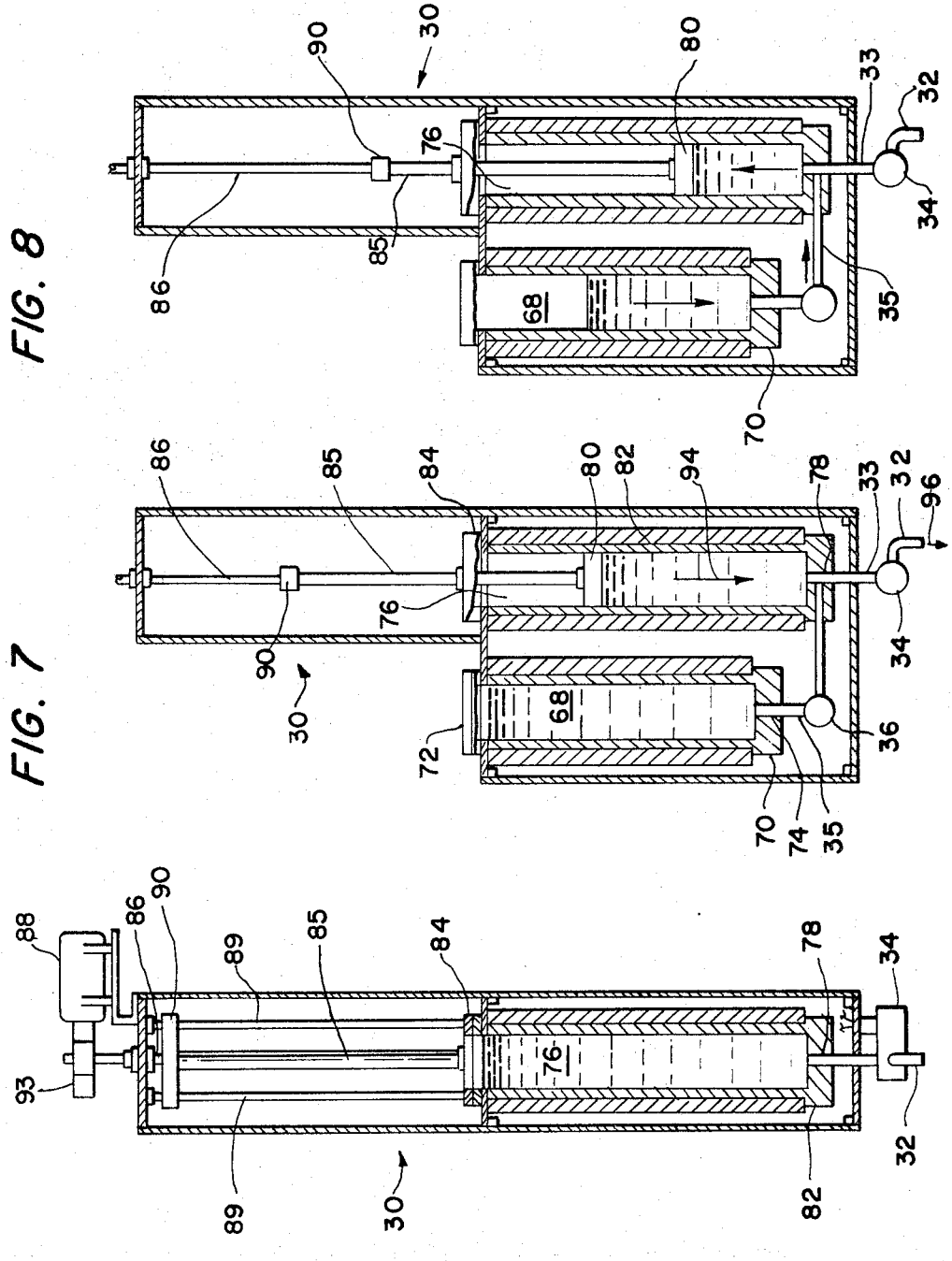

ASSEMBLY FOR POLYMERIC DISPENSING

The present invention relates to an assembly for storing and dispensing a liquid photocurable composition when used in association with a photocomposing apparatus. The invention also provides a new improved method for preparing articles such as printing plates when using the present assembly in combination with a photocomposing apparatus.

Photocomposing units available in the prior art have been complex and have had limited versatility for photocomposing with maximum efficiency. In most instances of the prior art a photocomposing composition has been stored in a supply container which is positioned remote to a use area thus giving rise to problems in transferring liquid photocurable compositions. Prior art attempts to overcome these difficulties generally have been unsatisfactory while proving to be complex and expensive. Accordingly, a substantial need has existed in the art for a suitable, economical means for storing and automatically dispensing liquid photocurable composition.

It has now been found that by practice of the present invention there is provided an assembly for storing and dispensing a photocurable composition in a simple, economical and highly versatile manner. The present assembly aids in exacting photocomposing which may be repeated with high efficiency while overcoming many of the deficiencies inherent in apparatus of the prior art.

Generally stated, the present assembly includes a movable carriage supporting a housing having a first chamber adapted for receiving and storing a liquid photocurable composition, and a second chamber in controllable flow communication with the first chamber for receiving and dispensing liquid composition. A reciprocably slidable piston is received in the second chamber to provide an effective means for dispensing liquid composition onto a support layer at a use location.

Practice of the present invention will become more apparent from the following detailed description taken in conjunction with the accompanying drawings wherein an embodiment of the present invention is illustrated with like numerals referring to similar elements throughout the several views.

In the drawings:

FIG. 6 is a sectional elevational view taken along line A—A of FIG. 2 showing a dispensing means of the present assembly;

FIG. 7 is a side sectional view of the assembly illustrated in FIG. 6 further showing dispensing of liquid photocurable composition; and FIG. 8 is a side sectional view of the assembly illustrated in FIG. 6 further showing transfer of a liquid photocurable composition from the storage chamber to the dispensing chamber.

Figure 1:
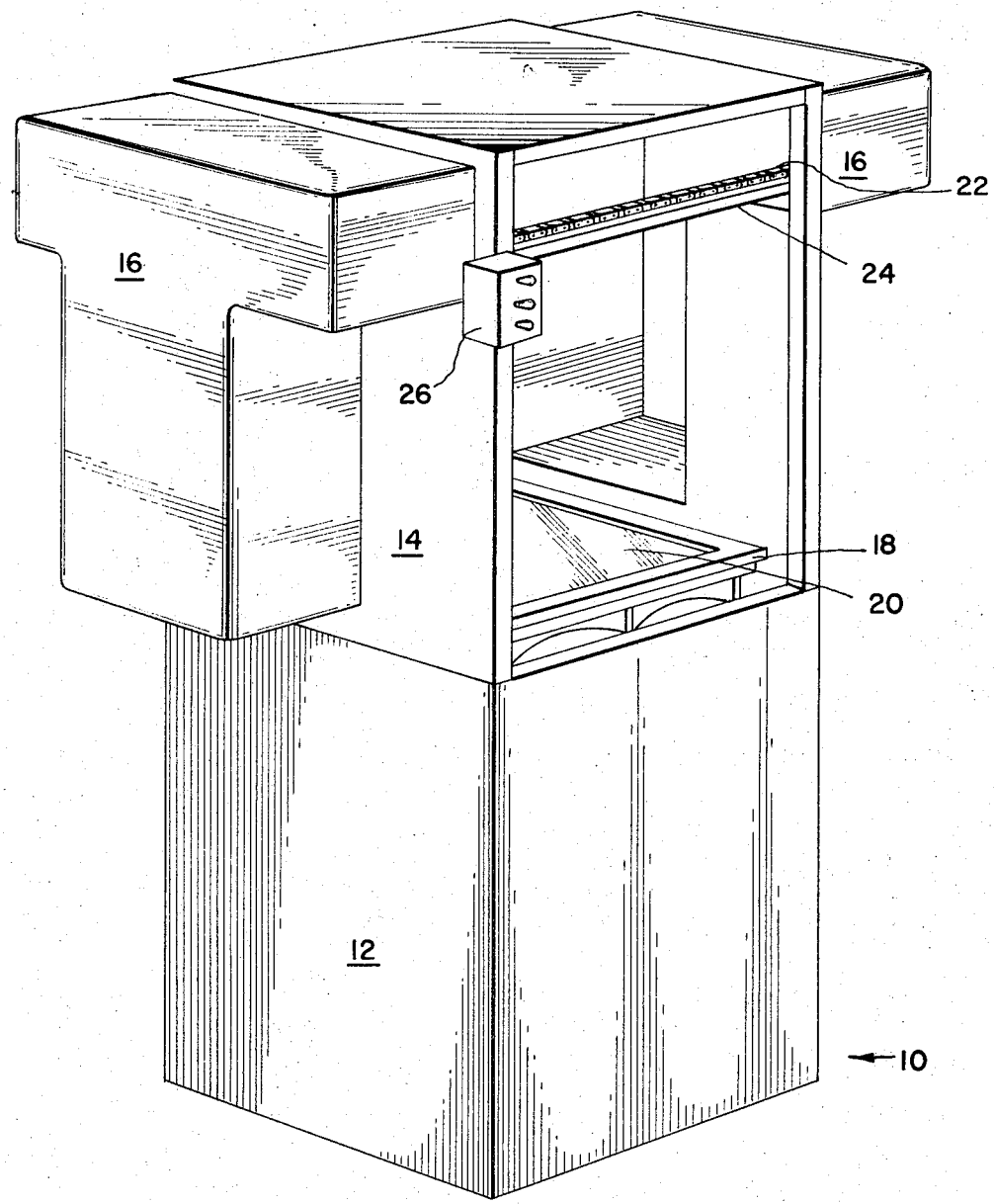
FIG. 1 is a perspective view generally illustrating a photocomposing apparatus including the present assembly as a component thereof.

Referring to FIG. 1 of the drawings, there is illustrated photocomposing apparatus 10 having lower compartment 12 and upper compartment 14 with attached, generally T-shape side compartments 16. Near a bottom portion of compartment 14 there appears platform 18 and work area platen 20. Near an upper region of compartment 14 appears chain conveyor 22 and track rod or rail 24. Chain conveyor 22 and rail 24 provide reversible movement for the present assembly during the dispensing sequence of liquid composition onto a support layer positioned on platen 20. Means for automatic control of the various functions are available by way of generally illustrated control panel 26.

In a region of compartment 14 generally above conveyor 22, there is included an actinic light source, not shown, which serves as a curing means for the photocurable liquid composition layered onto a support sheet on platen 20.

Figure 2:
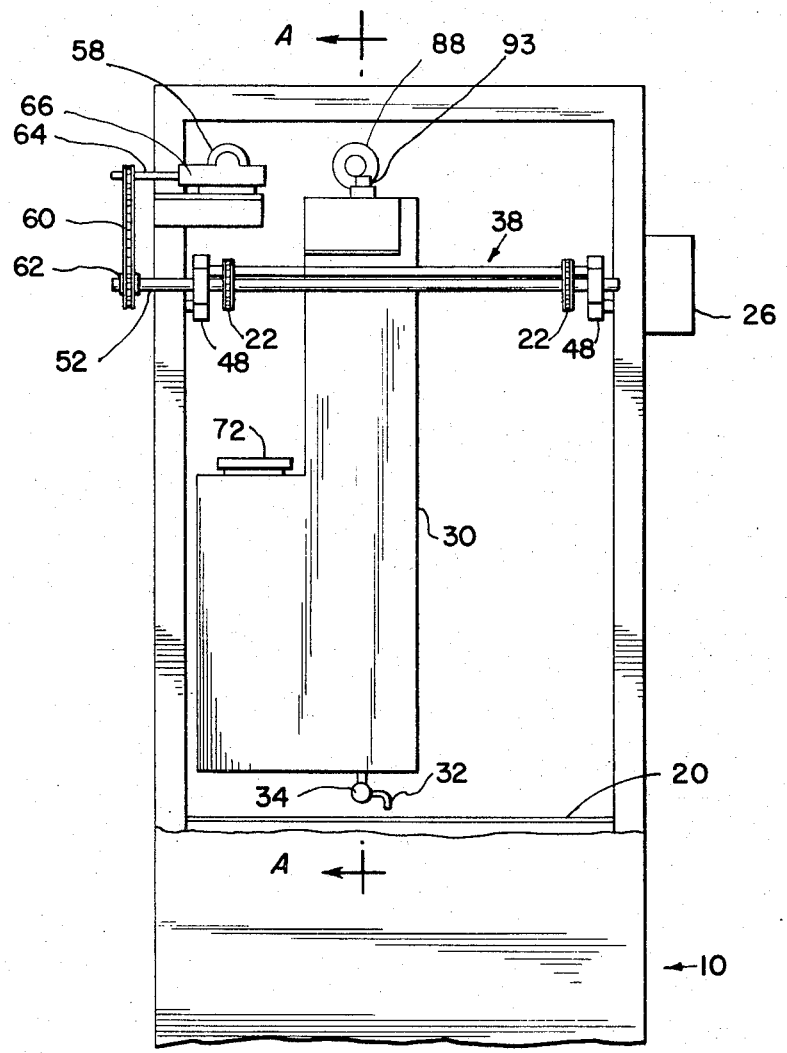
FIG. 2 is a partial side elevational view of the apparatus of FIG. 1 showing the present assembly within the photocomposing apparatus.
Figure 3:
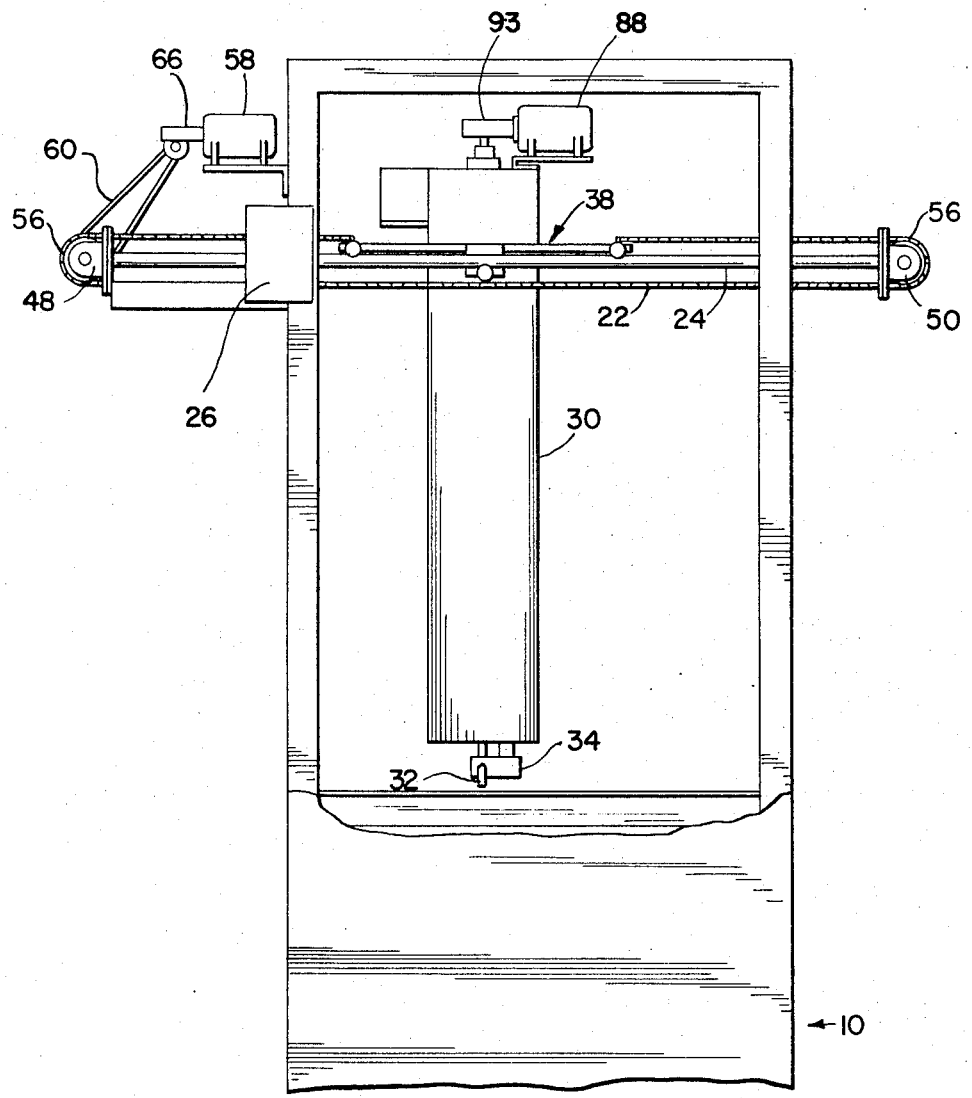
FIG. 3 is a partial front elevational view of the apparatus illustrated in FIG. 2.
Figure 4:
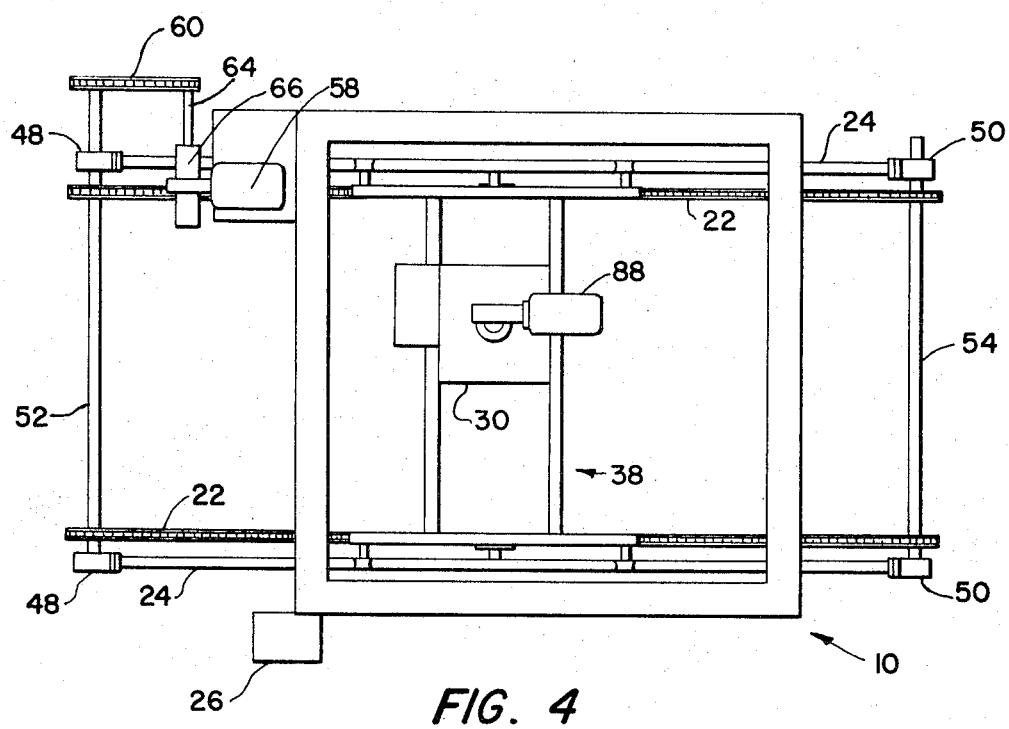
FIG. 4 is a top view of the apparatus of FIG. 1 with panel sections removed.

FIGS. 2–4 illustrate assembly 30 having a relatively short back portion containing a supply chamber, and a relatively extended front portion containing a piston-operated dispensing chamber. Spout 32 projecting from the bottom of assembly 30 dispenses composition and may include solenoid operated valve 34 for starting and terminating dispensing in cooperation with a piston described hereinafter.

Assembly 30 moves over platen 20 during the dispensing sequence. On a first pass over the platen, a strip of composition is dispensed onto a support sheet after which dispensing is terminated and the assembly returns to its start position ready for repeating the dispensing sequence. Motion of assembly 30 may be effected accurately and conveniently by means of movable carriage 38 adapted for riding on a track system described subsequently.

Figure 5:
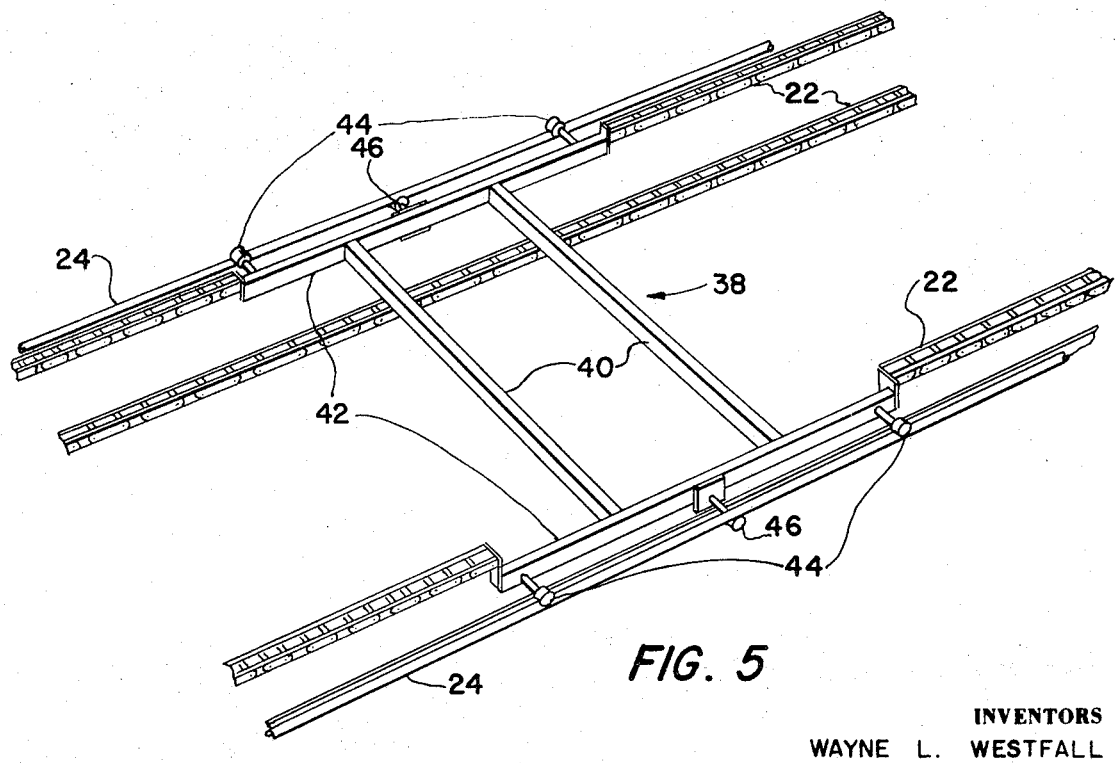
FIG. 5 is a partial perspective view showing in detail a carriage section of the present assembly.

Assembly 30 may include carriage 38, illustrated in detail in FIG. 5, having a pair of cross supports 40 for supporting assembly 30. Support bars 42 include rolls 44 which engage rails 24 on the upper surface, and center rolls 46 which engage the rails on the lower surface. Center rolls 46 may also serve to actuate and terminate dispensing by contact with a conveniently positioned switch. Various other means may be used to move carriage 38, as desired.

Rails 24 may be secured to a framework of compartment 14. Bearing pairs 48 and 50 appear at ends of rails 24 for receiving rotatable conveyor shafts 52 and 54. Sprocket wheels 56 are included on the conveyor shafts for engaging chain conveyors 22 which are attached to carriage 38 for reversibly conveying the carriage. Shaft 52 is operably connected with carriage motor 58 by a transmission means including endless chain conveyor 60 which engages sprocket 62 on rotatable shaft 52. Conveyor 60 may be actuated by a sprocket on rotatable shaft 64 of variable speed drive means 66 which in turn is driven by motor 58. Carriage 38 is desirably adapted for variable speed such as by means 66, by use of a variable speed motor or similar means as desired. Use of a variable speed carriage increases versatility and control of the present assembly.

FIGS. 6–8 illustrate in detail the storage chamber and the piston-operated dispense chamber of the present assembly. The storage chamber conveniently may be a generally cylindrical chamber, and appears as cylinder 68 in the relatively short back portion of assembly 30. Cylinder 68 includes an elongate cavity bounded on the sides and lower end by interior surfaces of generally cup-shape wall 70. The storage cavity is bounded on the top by a surface of removable cover 72 which may be pivotally hinged to wall 70 for swing-away operation. Pivotable cover 72 is included to facilitate introducing a liquid photocurable composition into cylinder 68. In use, cover 72 is securely closed against the top of wall 70 and forms a seal therewith for substantially air-free liquid storage. Storage cylinder 68 includes near its lower end opening 74 through which a stored liquid composition may be transferred into a dispense chamber described subsequently.

The dispense chamber conveniently may be formed having a generally cylindrical shape, and appears as dispense cylinder 76 in a lower section of the relatively extended front portion of assembly 30. Cylinder 76 includes an elongate cavity bounded on its sides and lower end by interior surfaces of generally cup-shape cylinder walls 82 and bounded generally on the top by plate 84 secured in sealed communication with top edges of wall 82. Hole 78 is provided through a lower end of wall 82 for receiving flow conduit 33 having flow communication with spout 32. Control of flow communication of the spout with conduit 33 may be effected by use of solenoid operated valve 34 provided for starting and stopping the dispensing sequence in cooperation with a piston described hereinafter.

The present assembly includes means for transferring a liquid photocurable composition from the storage chamber into the dispense chamber. The transfer means includes a flow conduit through which the chambers are in flow communication and appears as flow conduit 35 having a first end received in hole 74 and having a second end in flow communication with conduit 33. Flow conduit 35 may include solenoid operated valve 36 for starting and terminating transfer of liquid composition from the storage cylinder to the dispensing cylinder.

Transfer of composition from storage cylinder 68 to dispense cylinder 76 may be effected by a piston. Cylinder 76 includes a variable volume cavity bounded above by a lower face of reciprocably slidable piston 80, and bounded on the sides and bottom by interior surfaces of wall 82. Piston 80 has a peripheral edge which tighly conforms about an interior surface of the cylinder, thus forming a seal between the piston and the cylinder. The seal tends to prevent air contamination of the dispense chamber while serving to prevent seepage of the composition to the variable volume cylinder region above the piston.

While the present dispense chamber is illustrated having a substantially circular section normal to a vertical chamber axis, it is recognized that other chamber shapes may be used provided the piston used tightly conforms to the interior walls of the chamber.

Piston 80 is attached to piston rod 85 which slidably projects through plate 84 and terminates to slidable bracket 90 which is secured to rod 85. Holes disposed through the bracket have bars 89 which are secured near their lower ends to plate 84 and secured near their upper ends to the assembly housing, thus stabilizing bracket 90 and tending to prevent rotation of rod 85. A helical gear is provided internally of rod 85 for engaging worm gear 86 which may cooperate with the rod to reciprocably slide piston 80. Worm gear 86 may be driven by a drive means assembly appearing generally as piston-drive motor 88. Transmission means 93 operably connects gear 86 with the motor. The drive means regulates the speed of the piston for increasing dispensing versatility and precision. Examples of speed varying means include a variable speed motor, variable-speed transmission means 93 coupled with a substantially constant speed motor and the like. Desirably, means are included for synchronizing piston motion with carriage motion for even greater versatility, efficiency and control.

The dispense operation provided by the present assembly may be visualized with reference to FIG. 7 wherein arrow 94 indicates displacement of liquid photocurable composition by a downward stroke of piston 80. During dispensing, valve 34 is in the open position thereby permitting sequential passage of the piston displaced photocurable composition through conduit 33, valve 34 and spout 32 with delivery effected at the free end of the spout as indicated by arrow 96. Valve 36 is normally in the closed position during the dispense operation. Opening of valve 34 and beginning of a downward stroke of piston 80 may desirably be effected by means of automatic control switches. Valve 34 and motor 88 may be actuated in response to control signals which may be developed by contact of a switch-actuating member such as actuating roll 46 with suitably located switches. For example, microswitches may be disposed in suitable positions on compartment 14, rails 24 or the like as desired, such that during travel of carriage 38 over platen 20, the switches may be contacted by one or more rolls as desired.

The transfer operation for receiving a liquid composition may be visualized with reference to FIG. 8. Transfer of a desired portion of the composition into the dispense cylinder may be effected by opening valve 36 and operating motor 88 such that piston 80 is stroked upwardly. During transfer, valve 34 is normally in the close position. Piston 80 and valves 34 and 36 are desirably automatically controlled for the transfer operation, thus permitting simplicity of operation, reduced chance for human error and additional protection of the composition from contact with air prior to use. The automatic control reduces the chance that valve 34 will be open during transfer. Were valve 34 to be open, the action of upwardly stroking the piston would tend to cause back flow of air through spout 32 into the dispense cylinder.

Storage cylinder 68 may be pressurized with an inert gas, as desired. After receiving a liquid photocurable composition into cylinder 68 and after sealing cover 72, a vapor space over the liquid may then be substantially evacuated and thereafter filled with nitrogen or other inert gas. Use of an inert gas to blanket the composition tends to protect the composition from possible deleterious effects of oxygen, moisture and other matter often present in air to which the composition is sensitive.

Dispense cylinder 76 may also be adapted with means for evacuating, pressurizing and blanketing as desired.

Storage cylinder 68, dispense cylinder 76 and the conduit associated therewith may be adapted with means for controlling the temperature of the contents. Temperature control means are particularly desirable in view of the numerous types of polymer compositions useful herein which upon extended times at elevated temperatures may be found to prematurely gel, spontaneously polymerize, undergo degradation, or exhibit other deleterious effects.

The cylinders may also include means for agitating compositions received therein as desired.

Control panel 26 may conveniently have controls thereon for setting carriage 38 in motion and for governing the speed and direction thereof. The controls are provided with suitable connections to motors 64 and 88. The present assembly may include an automatic control switch near a first end of track 24 for effecting reversal of direction of the carriage after carriage 38 has passed over platen 20 in a composition dispensing operation. Further, a carriage stop switch may be provided near a second end of the track for stopping carriage motion after laying down a strip of photocurable composition. Thereafter, the cycle may be completed by return of the carriage. Carriage direction reversal switches and carriage stop switches may be effectively activated when contacted with switch-actuating members suitably disposed on carriage 38.

Electrical circuits for automatically controlling the present assembly for storing, transferring and dispensing a liquid photocurable composition may be readily devised by procedures well known to the art.

Solid state electronic speed controls are generally preferred herein for greater effectiveness in transferring and dispensing. A programmed piston speed may be used in controlling displacement rate of the photocurable composition displaced by the piston during the dispensing sequence.

Conveniently, the storage chamber of the present assembly is suited for use with photocurable compositions supplied in cartridge type plastic containers.

The versatility of the present apparatus and method is evidenced in part by the ability of the apparatus to accommodate a carriage movement speed range of wide extent, thereby providing for rapid preparation of photocured articles. Slower motion of the carriage is also possible as may be desired where highly viscous photocurable compositions are used, or where particular photocurable compositions having properties which may be more suitably accommodated by the present apparatus where low-speed delivery is used.

It will be appreciated that the width of the strip to be laid down is largely dependent upon the diameter of tubing used. However, the thickness (i.e., height) of the deposited strip is largely dependent upon the speed of the piston as well as the speed of the carriage. Accordingly, careful adjustment of carriage speed relative to piston speed is desirable for achieving precision lay down of the strip.

An important feature of the present invention is the use position of the polymer storage chamber relative to the platen. By locating the storage chamber and dispensing chamber such that they may be moved over the platen and in close proximity thereto, simplicity and practicality are provided.

In the method of the present invention a photocurable liquid composition may be applied in strip form to a support surface disposed on a platen by using the present assembly in conjunction with a photocomposing apparatus. The applied strip of liquid photocurable composition may then be distributed into a layer over the support surface, which layer may then be substantially leveled to a suitable uniform thickness. Such distributing and leveling of the liquid photocurable composition may be effected using the same means for distributing and for leveling, if desired. Next, a transparency may be mounted in a pre-selected position over the substantially uniform thickness of the photocurable composition. The layer may then be exposed to actinic radiation projected through substantially transparent areas of an image-bearing transparency to selectively photocure the liquid composition in the image areas with non-exposed composition portions remaining substantially liquid and removable as desired. The transparency may suitably be mounted on a transparent frame disposed over the photocomposition layer during photocuring.

The support sheet now having thereon selectively cured composition in the exposed regions and selectively uncured composition in the unexposed regions may be developed by mechanically blotting the uncured photocurable composition from the unexposed areas. Preferably, developing is effected by spraying water or solvent onto the developable printing plate to remove the uncured photocurable composition from the unexposed areas.

A photocurable system which is suitable for use herein is that consisting of a polyene containing at least two unsaturated carbon-to-carbon bonds per molecule, a polythiol containing two or more thiol groups per molecule and a photocuring rate accelerator.

Another composition operable to form a relief printing plate by the method of the present invention is that set out in British Patents 1,102,910 and 1,007,345. Therein the liquid composition consisting of a polyboron acid salt, a halide promoter which is dissociable by actinic light of wavelength between 2,500 A and 7,000 A, and at least one substance capable of undergoing cationic polymerization is cationically polymerized on exposure to actinic light having a wavelength in the range 2,500 to 7,000 A.

Another liquid photocurable composition useful herein to form printing plates is that set out in French Patent No. 1,471,432. Generally, liquid photosensitive compositions disclosed therein include an unsaturated polyester, an ethylenically unsaturated monomer lending itself to a reaction of addition polymerization, and a photosensitizer.

Thus, in carrying out the method of the present invention almost any liquid photosensitive composition capable, upon exposure to actinic radiation, of being photopolymerized or photocured or both to a solid polymer is operable herein to form a relief printing plate.

It is to be understood that the foregoing detailed description is given merely by way of illustration and that many variations may be made therein, including

What is claimed is:

1. An assembly which comprises in combination:
   a. a moveable carriage;
   b. means for reversibly moving the carriage over a work area in combination with a photocomposing apparatus, said work area adapted for receiving thereon a liquid photocurable composition, and said apparatus having means for selectively exposing a layer of said composition to radiation for photocuring;
   c. a first chamber adapted for storing liquid photocurable composition, said first chamber having means for receiving the composition and having an opening through a wall of the chamber for transferring the composition from the chamber;
   d. a second chamber adapted for controllable flow communication with the first chamber in receiving composition to be transferred from the first chamber, said second chamber having a hole through a wall thereof for dispensing the composition to the work area;
   e. receive-dispense means for selectively receiving the composition from the first chamber into the second chamber and for selectively dispensing the composition from the second chamber to the work area, said receive-dispense means including a reciprocably slidable piston received in the second chamber;
   f. means for reversibly sliding said piston; and
   g. housing means for housing said first chamber and said second chamber, said housing supported by said carriage.

2. The assembly of claim 1 wherein said assembly has start-dispensing control in response to actuation of a first control element actuatable by action of the assembly when the assembly is moving forwardly in a first zone by having a spout over a support sheet location preselected to receive a first-dispensed portion of the composition, and control means for continuing the dispense operation as the assembly continues forwardly leaving said first zone, and stop-dispensing control in response to actuation of a second control element actuatable by action of the assembly when the assembly is moving forwardly in a second zone by having the spout over a second location on the support sheet, said second location preselected to receive a last-dispensed portion of composition.

3. The assembly of claim 2 including electronic speed control means for controlling speed of a first reversible variable speed motor provided for driving the carriage, and including a second electronic speed control means for controlling speed of a second reversible variable-speed motor in preselected speed synchronization with speed of the first motor, said second motor being provided with means for driving the piston.

* * * * *